United States Patent [19]

Ivey et al.

[11] 4,131,036
[45] Dec. 26, 1978

[54] METHOD AND APPARATUS FOR TRANSMISSION CONTROL SYSTEM

[75] Inventors: John S. Ivey, Bloomfield Hills, Mich.; Alan L. Miller, Mount Prospect, Ill.

[73] Assignee: Borg-Warner Corporation, Chicago, Ill.

[21] Appl. No.: 805,363

[22] Filed: Jun. 10, 1977

[51] Int. Cl.$^2$ .................................... B60K 41/18
[52] U.S. Cl. ............................................ 74/866
[58] Field of Search .................................. 74/866

[56] References Cited

U.S. PATENT DOCUMENTS

| | | | |
|---|---|---|---|
| 3,710,647 | 1/1973 | Dach et al. ............... | 74/866 X |
| 3,956,947 | 5/1976 | Leising et al. ............ | 74/866 |
| 3,961,546 | 6/1976 | Gilmore et al. ........... | 74/866 |
| 4,031,782 | 6/1977 | Miller et al. ............. | 74/866 |

Primary Examiner—Lance W. Chandler
Attorney, Agent, or Firm—Robert L. Zieg

[57] ABSTRACT

A control system to change gear ratio in an automatic transmission through friction elements engaged by hydraulic pressure. A closed loop electrical circuit is completed between a transducer, which provides an electrical signal related to the output torque of the transmission, and a pair of control valves, to vary the pressure applied to a friction element by each control valve. A circuit for computing reaction torque is coupled between the transducer and a logic control circuit, which provides logic command signals for controlling operation of components in the closed loop circuit. The system computes an output torque ramp when a downshift is called for by the shift point computer and uses controllers which react oppositely to control engagement of a clutch and brake in response to error signals of torque output compared to a desired ramp to produce a proper shift.

14 Claims, 3 Drawing Figures

METHOD AND APPARATUS FOR TRANSMISSION CONTROL SYSTEM

BACKGROUND OF THE INVENTION

Various systems have been devised and implemented to control the change of gear ratios in an automatic transmission. This is generally done with a hydraulic system, including a hydro-mechanical control valve mechanism for modifying the pressure applied to various friction elements in the transmission and to selectively hold and release different components of a planetary gear set.

A great deal of research has been directed to optimizing the shift "quality". In general, it is not desirable to have a shift of a very brief duration, as this produces a jerk by the rapid change in vehicle acceleration, which is very noticeable and found objectionable by most drivers. If the shift time is stretched out for too long a period, undue wear is imposed on the friction elements and other components of the transmission. Therefore, the optimum shift quality occurs somewhere between the too-short time duration, producing the objectionable jerk sensation, and the too-long time duration producing the objectionable component wear. A comprehensive treatment of this subject has been provided by F. J. Winchell and W. D. Route in "Ratio Changing the Passenger Car Automatic Transmission", which appears as Chapter 10 in the SAE publication "Design Practices — Passenger Car Automatic Transmissions", Copyright by the Society of Automative Engineers, Inc., 1973. In particular FIG. 21 of this chapter depicts speed, torque and pressure variations during a power-on upshift.

A significant advance in ratio-changing control has been achieved in a control system which regulates the energization of the on-coming friction element, in which the off-going friction element is embodied in a one-way clutch which automatically releases. Hence, the control is directed only to the precise regulation of the on-coming element in a three member planetary gear set. This significant advance is described and claimed in the earlier application of Alan J. Miller and John S. Ivey entitled "Transmission Control System", filed Feb. 27, 1976, Ser. No. 661,896, now Pat. No. 4,031,782 and which is assigned to the assignee of this invention.

Such earlier systems generally use a controlled friction element in parallel with the one-way clutch for reasons explained therein. Properly timing a shift wherein one friction element is released and another is engaged is more difficult and particularly where a downshift is involved and establishment of the lower ratio before the engine RPM has increased to the proper level will produce a faulty shift. It is therefore a principal object of this invention to provide an electronic control system for down-shifting an automatic transmission, in which a simplified and precise control is provided for the on-coming friction element and for the off-going friction element.

SUMMARY OF THE INVENTION

An electronic control system is provided to regulate the change of gear ratio in an automatic transmission. A transducer is positioned to sense transmission output torque and provide an electrical signal which varies as a function of that torque. A first control valve varies the fluid pressure to the on-coming friction element, and a second control valve varies the fluid pressure to the off-going friction element to effect a change in gear ratio, and an error signal is provided to control the operation of both valves. A closed loop controller is coupled between the transducer and the control valves, to receive the torque-indicating signal and provide the signals for regulating both control valves as a function of the output torque signal.

In accordance with this invention, downshift control components are added, to the system illustrated in the aforementioned application, Ser. No. 661,896, now Pat. No. 4,031,782 to provide the requisite command signals for application to the closed loop controller to regulate the on-coming and off-going elements. This is accomplished by calculating a torque ramp when a downshift is called for and having a controller for each element responding oppositely to an error signal defined by the torque output as compared to the desired torque ramp whereby the friction elements are regulated to have the torque output follow the ramp until the proper engine speed is reached and the lower ratio is fully established.

THE DRAWINGS

In the several figures of the drawings, like reference numerals identify like components, and in those drawings.

DETAILED DESCRIPTION OF THE PREFERRED EMBODIMENT

Figure 1:
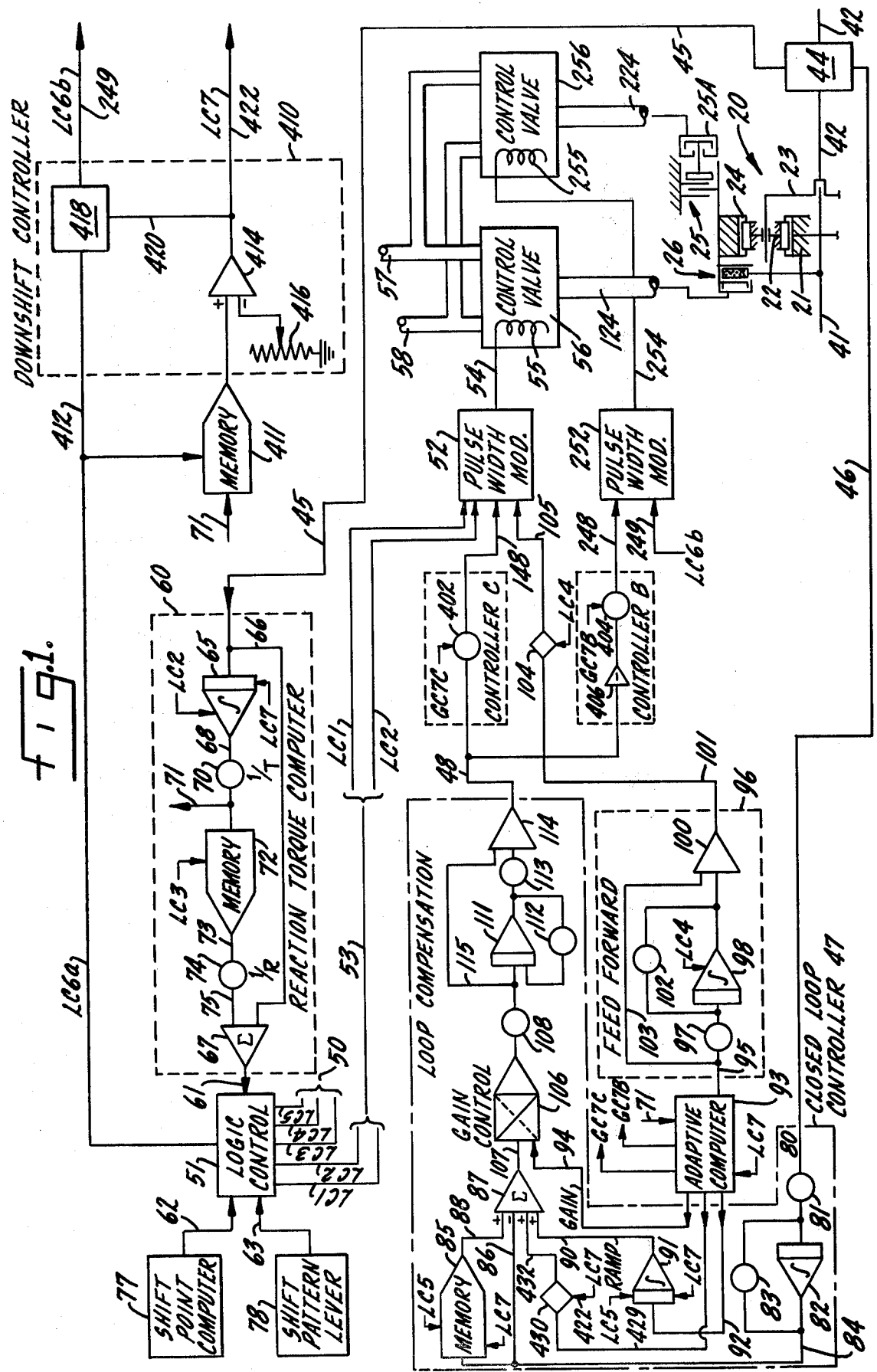
FIG. 1 is a schematic diagram of an electronic control system incorporating the principles of the present invention.

FIG. 1 depicts in a block arrangement an electronic control system including that described in the earlier mentioned application, Ser. No. 661,896, now U.S. Pat. No. 4,031,782 for changing the gear ratio in a transmission 20.

Planetary gear set 20 is schematically illustrated and is of a type which may be used in automatic transmissions, to provide a drive relationship between a drive or input shaft 41 and a driven or output shaft 42. A sun gear 21 is connected to shaft 41, which represents the input mechanical driving connection to the automatic transmission. That is, drive shaft 41 and sun gear 21 receive drive from the engine or other prime mover. Meshed with sun gear 21 are a plurality of pinion gears 22, generally termed "planets" in that they can rotate around the sun gear 21 in addition to rotating upon their own axes. A carrier 23 is provided, connected to driven shaft 42, and has rotatably journalled thereon each of the planet gears 22. Outside the planet gears is a ring gear 24, which has teeth on its inner surface meshing with the teeth of the planet gears as they rotate with respect to the ring gear. In general when the sun gear 21 is driven with the ring gear 24 held stationary, output drive torque is available from planet carrier 23 and driven shaft 42.

A friction brake 25 is provided operable to provide a connection between ground or a stationary member and ring gear 24. A friction clutch 26 is schematically illustrated as engageable to connect ring gear 24 and sun gear 21 for rotaton together.

When ring gear 24 is locked against rotation, planet gears 22 are rotated when the sun gear is driven, and output drive at a first reduced speed ratio may be taken from driven shaft 42. When it is desired to change the speed ratios, or shift gears, this is accomplished by releasing the outer ring gear 24 and connecting the ring gear with sun gear 21 with clutch 26. This provides a direct drive between the input and output shafts at a second speed ratio of 1:1. Of course additional combinations of planet and ring gears can be provided to produce a multiplicity of speed ratios in an automatic transmission.

Referring again to FIG. 1, a transducer 44 is positioned to sense the torque at the output driving connection of the transmission, and to provide an electrical signal which is a function of the output torque, on each of lines 45 and 46. A closed loop controller 47 comprises a plurality of components, as will be explained hereinafter, for providing an error signal on line 48 as a function of both the output torque signal received as a feedback signal over line 46, and a plurality of logic command signals received over line 50 from a logic control circuit 51. The error signal on line 48 is applied through an actuation means or controller C and line 148 to a pulse width modulation circuit 52, which also receives a plurality of logic command signals over line 53 from the logic control circuit. The output signal from the pulse width modulation circuit 52 is a control signal which is applied over line 54 to a winding 55 which is part of an electro-hydraulic control valve 56, the output side comprising a conduit 124 of which is coupled to clutch 26 of the transmission. Conduit 57 is connected to receive a fluid under pressure from a pump (not shown) in a manner well known and understood in this art.

The error signal on line 48 is also applied, through an actuation means or controller B and line 248, to a pulse width modulation circuit 252, which also receives logic command signal LC6b over line 249. The output signal from circuit 252 is also a control signal which is applied over line 254 to a winding 255 which is part of an electrohydraulic control valve 256, the output of which is a conduit 224 which is connected to a servomotor 25A for brake 25.

A reaction torque computation circuit 60 used primarily for upshift functions is connected to receive the output torque signal over line 45 and produce, an output line 61, a simulated reaction torque signal for application to the logic control circuit 51 which is used in an upshift ratio change. The logic control circuit also receives a signal over line 62 representing a shift point, to indicate issuance of a shift command. A shift pattern signal can be generated and supplied over line 63 to the logic control circuit 51. The shift pattern signal on line 63 is that provided when the driver moves the shift lever into a position (that is, a position such as "park", "reverse", "neutral", "drive" and so forth) which changes the operation of a control valve (not shown) and "tells" the electrical system which control valve is to be operated. The shift point signal on line 62 is derived from a unit (not shown) which issues a signal when a shift — up or down — should be initiated. Electronic systems for providing this signal are available. For purposes of this explanation, conductor 62 is considered as means for providing a shift point signal, and a conductor 63 is deemed means for providing a shift pattern signal. The logic control circuit 51 receives the reaction torque signal, the shift point signal and the shift pattern signal (an explanation of the shift pattern signal is not necessary to an understanding of the basic system operation), and provides a plurality of logic command signals for application over the output cables 50, 53 to effect the operation of components within closed loop controller 47 and the operation of pulse width modulation circuits 52 and 252. The reaction torque computation circuit 60 is an important component of the earlier system.

Reaction torque computation circuit 60 also provides an average torque level signal on line 71, by averaging the instantaneous torque signal received from the transducer over a given time period. This average torque signal is applied to an adaptive computation circuit 93, which produces output signals that vary as a function of the average torque level. The first output signal from adaptive computation circuit 93 is applied over line 92, 94 as an input command signal to closed loop controller 47. This first output signal effects the controller operation and during an upshift varies both the slope of the "ramp" portion of a torque curve to be followed, and the gain of the closed loop controller. On an upshift, the second output signal from adaptive computation circuit 93 is applied over conductor 95 to a feed-forward circuit 96, which in turn passes a signal over line 101 to pulse width modulation circuit 52. The feed-forward circuit in effect compensates the control valve 56 operation for the time required to fill the piston before the static phase of the shift is commenced. Hence the adaptive computation circuit 93 and the feed-forward circuit 96 improve the overall regulation of the earlier closed loop control system during an upshift. Reaction torque computer circuit 60 is shown to include several stages, with the line 45 being coupled both to the input side of an integrating stage 65 and, over line 66, to one input connection of a summation stage 67. The output side of integrating stage 65 supplies the integrated torque signal over line 68 to a passive circuit 70, effective to multiply the signal on line 68 by the ratio 1/T, representing a time division to produce on line 71 a signal which represents the average driveline torque provided on shaft 42 over the time period T. The application of logic command signals LC2 to the integrating stage 65 and LC3 to the memory stage 72 are shown, with each logic command signal being generated by the logic control circuit 51 as will be explained herein-after. The output of memory stage 72 then supplies the average driveline torque signal (for the time T) over line 73 to the passive stage 74, effective to multiply this signal by 1/R or provide on line 75 a signal which represents the average driveline torque adjusted for the gear ratio established. This signal on line 75 is the other input signal to summation stage 67, which then provides the reaction torque signal on line 61 for application to the logic control circuit 51.

Those skilled in the art will appreciate that the reaction torque computer circuit 60 is depicted with simplified analog components connected to provide a reaction torque signal on line 61 used during an upshift function as a function of a received instantaneous torque signal on line 45. This is done with the illustrated integrating, memory, divide down and summation stages. It will be apparent that a microprocessor or other digital circuits can be connected to operate in a known fashion to produce the reaction torque signal on line 61 in response to the received instantaneous torque signal on line 45. Hence the terms "reaction torque computation circuit" and "adaptive computation circuit", as used herein and in the appended claims, embrace both the analog and digital forms of such circuits which are well known and understood in this art.

Shift point computer 77 provides a signal on line 62 to the logic control circuit 51 when a "shift" command is initiated. Likewise a shift pattern lever 78 is conventionally used to provide the shift pattern signal on line 63 to the logic control circuit.

The instantaneous output torque signal on line 46 is applied as shown to the closed loop controller 47, and is initially applied to a feedback filter circuit 80. The signal passes through a first passive component 81 and an active stage 82; a passive component 83 is coupled in parallel with stage 82. The passive components depicted by the circular symbols (such as 81, 83) can be implemented by the use of a fixed or variable resistor. Filter circuit 80 provides a filtered output signal on line 84 which is applied both to the input side of a memory stage 85 and, over line 86, to one of the input connections of a summation stage 87, which also receives second and third input signals. The second input signal is received over line 88 from memory 85, which receives not only the filtered input signal on line 84 but also receives an LC5 logic command signal during an upshift from logic control stage 51. All of the logic command signals (LC1–LC5) are operational mode signals. They issue in a sequence to regulate the operational state of other components during upshifts, rather than provide information or command input signals to those components. A third input signal received by summation state 87 is received over line 90 from another active stage 91, an integrator stage which is connected to provide a ramp slope signal as a function of a level or amplitude signal received over line 92 from an adaptive computer 93. The ramp slope stage 91 also receives an LC5 or an LC7 logic command signal. Stage 87 also receives a "step-input" signal on line 431 as will be discussed later during the downshift function. Thus stage 87 receives a feedback signal on line 86, and on lines 88, 90 and 431 receives ramp determining signals which are collectively termed the "input command" signal.

The adaptive computer 93 includes several circuits, each of which receives the signal over line 71 from the reaction torque computer denoting the average driveline torque during a time period. The instantaneous driveline torque varies because of the engine variations, torsional vibrations, wheel slip and other irregularities. Hence an average signal must be provided to avoid erroneous operation of the system, and this average signal must be provided in a preset time frame during the shift sequence. From the average torque signal on line 71 and the information stored in the computer, a level signal is provided on line 92 to regulate the torque during the shift period, in that it generally controls the slope of the "ramp" of the desired torque curve. The adaptive computer 93 also provides a gaincontrol signal on line 94, and a third output signal used on upshifts on line 95 which is coupled to a feed-forward circuit 96. This feed-forward circuit used for upshifts includes a first passive element 97, an active component 98 which receives not only the signal from component 97 but also an LC4 logic command signal, and an output active component 100 for providing an output signal from the feed-forward combinations on line 101. A passive feedback component 102 is coupled around active stage 98, and a direct signal correction is provided from the input side of element 97 over conductor 103 to one input connection of stage 100. This feed-forward circuit is an anticipation circuit for providing a signal over line 101 on upshift which tends to compensate for the time delay required to fill the piston volume of the friction elements.

The output signal from feed-forward stage 100 is passed over line 101 to another active element 104, which operates as a switch that is closed upon receipt of an LC4 logic command signal to provide an output signal over line 105 to the pulse width modulation circuit 52 during an upshift. Pulse width modulator circuit 52 thus receives four input signals: the error signal over lines 48 and 148 from the closed loop controller 47; the feed-forward compensating signal over line 105; and the logic command signals LC1 and LC2 from the logic control circuit 51.

Details of the construction of the adaptive computer 93 the control valve assemblies 56, and 256, the pulse width modulator circuit 52, and the logic control 51 may be obtained by reference to the aforementioned application Ser. No. 661,896, now U.S. Pat. No. 4,031,782 filed Feb. 27, 1976 which is incorporated herein by reference. Also that application may be referred to for the operational details of the various components and their operation in controlling upshift operation where a one-way brake is provided to hold ring gear 24 stationary. Further reference may be had to application Ser. No. 756,470, of common assignee for details of a control system properly set out and described for controlling a downshift through the transmission wherein a change is made from one friction element to another, but incorporating a different type of control function to establish the downshift, based upon use of a desired engine acceleration torque ramp system.

The present system utilizes a unique method and concept of control of two friction elements in providing a downshift which is particularly adaptable to use with electronic type controls as illustrated and described with respect to FIG. 1. Those details of the circuit disclosed in FIG. 1 which are added to accomplish this unique form of downshift will now be described, it being understood that certain of the controls illustrated and disclosed are so illustrated for clarity of explanation and could in fact in many cases be built in combination with other electronic components to accomplish the desired function. Further, the same structure utilized to establish the downshift concept can be utilized to other types of shifts to be made and it is anticipated that this would be done and the showing of FIG. 1 is purposely shown in a form to clearly illustrate the downshift concept.

Line 48 as described in the aforementioned application applications carries a control signal to be utilized by the pulse width modulator circuits 52 and 252 to control friction elements. Provided in this connection is a Controller C connected to pulse width modulator 52 and a Controller B connected to pulse width modulator 252. Controller C includes a gain control 402 and Controller B includes a gain control 404. Also provided in Controller B in series with gain control 404 is an inverter 406 adapted to invert the signal received from line 48. A downshift controller 410 is provided which is connected to the logic control by line 412. Downshift controller 410 includes a comparator 414 connected to a variable voltage source 416 and further includes a logic circuit 418 connected to the output of comparator 414 by line 420. A line 422 also is connected to carry the output of comparator 414. A memory circuit 411 is provided connected to line 71 and line 412. The output of memory 411 is carried by line 413 to comparator 414. Logic circuit 418 is carried by line 413 to comparator 414. Logic circuit 418 is a NAND type circuit, that is it will be given an output signal on line 249 when either one of lines 412 or 420 connected thereto have a signal, but when both inputs 420 and 412 have a signal, the output is zero on line 249.

Line 422 is also connected to the ramp stage 91, the memory stage 85, a switch 430, and the adaptive computer 93. Line 412 carries a logic command signal LC6a to the downshift controller 410. Line 429 connects the adaptive computer 93 to switch 430 which is in turn connected to stage 87 by line 432. Line 249 carries a related logic command signal LC6b to pulse width modulator 252. Line 422 carries a logic command signal LC7 produced by the downshift controller to switch 430, ramp stage 91 and adaptive computer 93.

Operation of the Control System for Downshift

When the transmission has been operating in high ratio with clutch 26 engaged and brake 25 released, the plus input on line 88 and the minus input on line 86 at summation stage 87 are equal and the output on line 107 is zero. Therefore, the signal at 48 is also zero and due to the operation of logic control 51 and the pulse width modulator 52 control valve 56 is supplying full pressure and holding clutch 26 engaged. This operation is fully described in copending application Ser. No. 661,896, now U.S. Pat. No. 4,031,782 filed Feb. 27, 1976.

At a given time the shift point computer 77 or shift pattern lever will send a signal to logic control 51 to call for a downshift, that is, a lower ratio with brake 25 engaged and clutch 26 released. In response to the downshift signal, logic control 51 produces a logic command signal LC6a on line 412. The signal on line LC6a will be supplied initially through logic circuit 418 in downshift controller 410 to produce signal LC6b on line 249. Signal LC6b is applied to pulse width modulator 252, which in turn moves control valve 256 to its full "on" on condition to begin to fully engage brake 25.

Figures 2, 3:
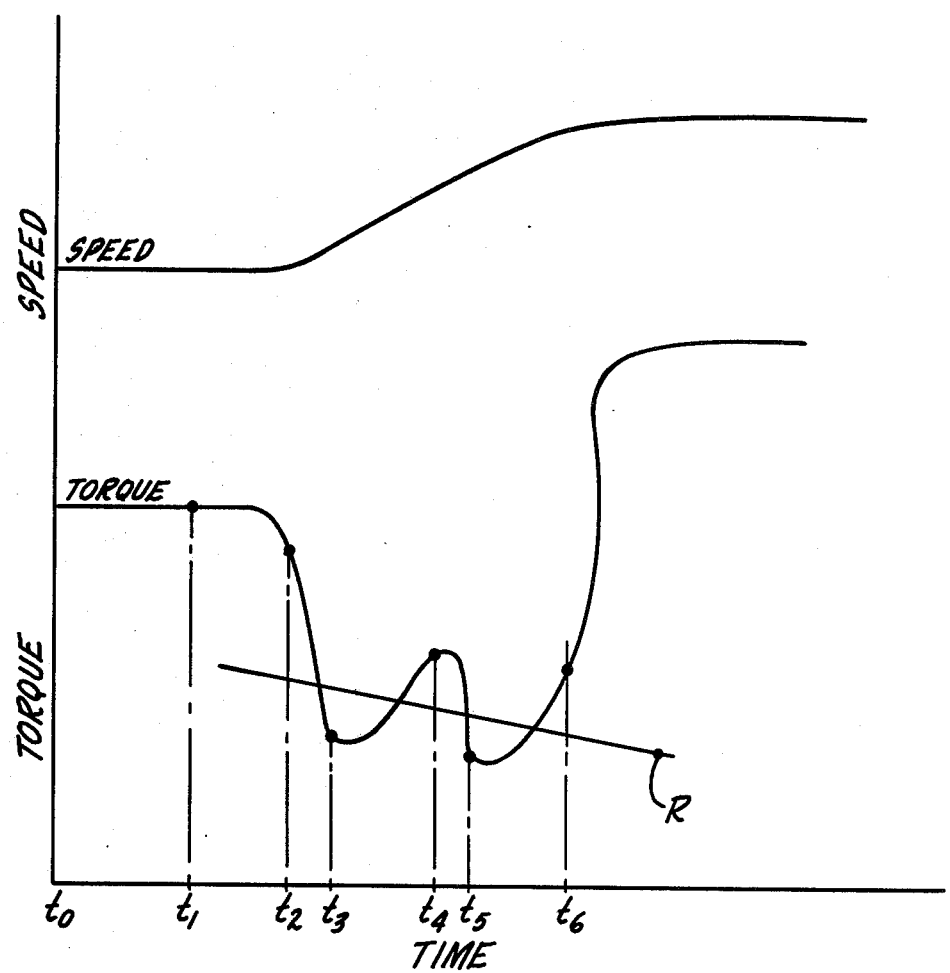
FIG. 2 is a graphic illustration of torque output and speed during a downshift with the control system of FIG. 1.
FIG. 3 is a table illustrating the condition of the friction elements at specific times.

FIG. 2 is a graphic illustration showing output shaft torque and engine speed level on a time basis. Referring to FIG. 2, the logic control signal is produced by logic control 51 at time $t_1$ and therefore, at time $t_1$ since the clutch is fully engaged and the brake 25 is beginning to be engaged the output shaft torque will drop as shown on the torque curve of FIG. 2 between points $t_1$ and $t_2$. As described above memory 411 is activated by logic command LC6a to store the average output shaft torque from line 71 and supply same to line 415. At a predetermined drop in the torque curve when the torque related signal on line 415 differs from the value established by variable voltage source 416, comparator 414 will be activated to connect line 412 to line 422 and produe signal LC7 on line 422. The signal on line LC7 is received through line 420 and as described the NAND circuit in logic circuit interrupts or turns off signal LC6b on line 249.

A signal on line LC7 activates memory stage 85 to store the output shaft torque signal and supply same to summation stage 87. Signal LC7 also is imposed on ramp slope stage 91 which will produce a slope of desired torque ramp as shown in FIG. 2 labeled R. This signal received at summation stage 87 is a negative signal.

Signal LC7 also actuates switch 430 to produce a "step input" signal on line 432 which is a further negative signal received at stage 87. The step input represents the torque drop required between the torque output line at $t_2$ and the desired level at ramp R at that time.

Beginning at time $t_2$ the torque in output shaft 42 is continuously monitored and processed by the closed loop controller 47 to produce either a plus or minus error signal on line 48. A plus signal means that the torque is higher at a given time than the ramp R and the minus signal meaning that the torque is below the ramp R. Controller C is actuated in response to a positive error signal to tend to disengage clutch 26 and to a minus error signal to engage clutch 26. Controller B operates reversely tending to release the brake in response to a minus error signal and engage the brake in response to plus error signal. As described above, the error signal through Controllers B and C will stimulate pulse width modulator circuits 52 or 252 to actuate control valves 56 or 256 to change the pressure produced by the valves to tend to increase or decrease engagement of the clutch 26 and brake 25. As described Controller B includes an inverter 406 which is not in Controller C. Thus, Controllers B and C respond oppositely to a signal on line 48. As mentioned the Controller C responds to a negative error signal such as would be generated at $t_3$ shown in FIG. 2 to produce a signal tending to engage clutch 26. Due to the inverter 406 in Controller B, Controller B will respond to a plus signal in line 48 to tend to disengage brake B as shown at time $t_3$ in FIG. 2. Of course, when a positive error is received as at $t_4$ Controller C will be actuated to tend to release clutch C and Controller B will be actuated oppositely to tend to engage brake B.

The sequence then of controlling the downshift to the point of having clutch 26 fully released and brake 25 fully engaged is illustrated in FIG. 2 wherein as indicated at time $t_1$ logic signal LC6b is produced which tends to engage brake 25 and thus as shown at time $t_1$ in FIG. 3, both clutch and brake are in the engaging function which will produce a drop in torque in the output shaft. When the drop in torque reaches point $t_2$ the signal LC6b is removed from pulse width modulator circuit 252 by the downshift controller 410 as explained, and the ramp R is produced by the slope stage 91 as induced by signal LC7 and a positive error signal will be created at time $t_2$ which will tend to release the clutch and brake 25 will still be in its release mode. As shown in FIG. 3, at time $t_2$ the clutch is releasing and the brake is also releasing even though there is a positive error signal at this time. Adaptive computer 93 receives signal LC7 and produces signal GC7C and signal GC7B. Signal GC7C is applied to gain control 404 in Controller B. Thus, the gain controls 402 and 404 are controlled by signals from the adaptive computer 93. The adaptive computer provides a predetermined relationship between the gain controls 402 and 404 in response to signal LC7 to properly set the gain controls for a downshift. Gain controller 404 is set to provide a slower response than gain controller 402 in Controller B to prevent hunting in the system. At time $t_2$, since signal LC6b has been turned off, and due to the slow response of Controller B and the fact that valve 265 is biased to the off position, brake 25 will remain in the release or disengaging mode until time $t_3$ even though there is a positive error signal.

At time $t_3$ the torque has dropped below ramp R and a negative error signal is produced on line 48 which tends to engage clutch 26 and release brake 25 as described above. Clutch 26 tending to be engaged and brake 25 tending to be released, the torque in the output shaft 42 will again rise as shown in FIG. 2. When the torque rises above the ramp R a given amount at time $t_4$, for example, a positive error signal will be produced, which will tend to activate Controllers C and B to tend to release clutch 26 and release brake 25. Since the vehicle engine is not yet at the proper RPM level to handle the lower ratio established by engagement of brake 25. The torque in response to the condition created at time $t_4$ will drop as shown in FIG. 2. At time $t_5$ a negative error signal is again produced which actuates Controller B tending to release brake 25. Then again the torque rises as shown between times $t_5$ and $t_6$. At time $T_6$ when a positive error signal is again created, Controller C will tend to release clutch 26 and Controller B will tend to engage brake 25. However, at this time, for example, the vehicle engine may be at the proper increased speed to handle the lower gear ratio established by engagement of brake 25, and if so, as the brake 25 is engaged more fully the torque will now build up rather than reduce since the engine is ready for the ratio being established; and the controls will maintain the positive error signal and will continue in the mode of releasing clutch 26 and engaging brake 25 so that there is a complete release of clutch 26 and a complete engagement of brake 25 and the torque in the output shaft reaches the maximum level as shown in FIG. 2.

Uniquely, as described above, inherent in the alternate engagement and disengagement of clutch 26 and brake 25, as illustrated in FIG. 2, when the engine speed has reached the proper RPM level, engagement of the brake at the $t_6$ point, for example, results in a torque increase rather than a torque drop. Thus, the state of the control just after $t_6$ is to continue commanding the release of the clutch and engagement of the brake whereby the result is full engagement of the brake and full release of the clutch automatically at the proper time.

It should be noted that in FIG. 2 a specific slope and position or torque level of Ramp is illustrated. However, it will be apparent that other slopes and torque levels may be used to fit specific conditions and that variable signals can be used in the ramp stage 91, and the switch 430, to vary the slope and position for a proper downshift under specific vehicle conditions.

The preferred embodiment as described above, provides for control of friction devices to provide alternate engagement and disengagement of the devices in response to a single error signal by means of inverting the error signal, through one of the pulse width modulation circuits, to get opposite actuation of the control valves, and thus engaging pressure at one friction element and reduction of engaging pressure at the other. As will be apparent to those of ordinary skill in the art, other means of obtaining opposite reaction to the error signal can be provided. For example, by having one of the friction elements of the type which is engaged by fluid pressure, and the other which is disengaged by fluid pressure and in such system, the same error signal without inversion can be applied through each pulse width modulator to the control valves for each friction element since one of the elements will be engaged and one disengaged by either an increase of pressure to both valves or a decrease of pressure through both valves. Further, the control valves being of the type controlled by a pulse width modulation circuit can be constructed so that one of the control valves reacts oppositely to the same signal received at the other control valve, so that one control valve will apply an increase in pressure to a given signal and at the same time the other control valve will provide a decrease in pressure so that same signal. Thus, as will be apparent, the present invention which contemplates having two friction elements react oppositely to a given error signal to follow a downshift torque ramp can be carried out by alternate construction which are contemplated by the present invention.

The above preferred embodiment includes controllers and pulse width modulators to control, control valves of the type which respond to pulse width modulation. However, a variable fluid pressure can be produced by a control valve of the servo-valve type, and this type of valve can be used with amplifiers, replacing the controllers and the pulse width modulator circuits in the preferred embodiment, to carry out a similar function as that described in the above mentioned description. The amplifiers in such case would amplify the error signal to produce a variable electrical energy signal and the valves would respond to the signal by providing a variable pressure directly proportional to the value of the electrical energy signal received.

It should further be noted that specific circuitry has been illustrated to carry out the present invention whereby the resulting alternate engagement and disengagement of the clutch and the brake is performed to obtain approximation of the desired torque ramp, resulting in a proper downshift, but it will be apparent that variations in the circuitry and other arrangements may be used to obtain the same results without departing from the scope of the present invention.

Although, in the above description reference is made to the error signal being positive when output shaft torque is above the downshift ramp and negative when the output shaft torque is below the downshift ramp, it is understood that such positive and negative terms may refer to the relative differences between the downshift ramp and output shaft torque and is not to be construed as soley referring to the polarity of the error signal.

We claim:

1. An electronic control system for regulating change of gear ratio in an automatic transmission which has input and output mechanical driving connections, a first and second controllable friction elements connected for actuation by a change in fluid pressure applied thereto comprising:

a transducer, positioned to sense the torque at the transmission output driving connection and to provide an electrical signal which varies as a function of the output torque;

a first control valve, coupled to a supply fluid line for regulating the fluid pressure at the first friction element;

a second control valve, coupled to the fluid supply line for regulating the fluid pressure at the second friction element;

first and second pulse width modulation circuits, respectively coupled to the first and second control valves, for providing control signals to regulate operation of the valves;

a closed loop controller, coupled between the transducer and the pulse width modulation circuits, including means to provide an output shaft torque downshift ramp in response to a downshift signal and to receive the output torque signal as a feedback signal and provide an error signal with respect to said ramp for regulating operation of the first and second pulse width modulation circuits as a function of the error signal;

said error signal being plus or minus and means in the circuit between said closed loop controller and said second pulse width modulation circuit to invert said signal whereby said first and second pulse width modulation circuits react oppositely to said error signal so that said friction elements are controlled in a way to have the output shaft torque follow said downshift ramp.

2. An electronic control system as claimed in claim 1, including a downshift controller responsive to a downshift signal from a logic control circuit to provide an engagement signal to actuate said second pulse width modulation circuit to start engagement of said second friction element to initiate the downshift.

3. An electronic control system as claimed in claim 2, wherein said downshift controller includes a comparator also receiving a downshift signal which is related to the output shaft torque and responsive to a drop in output shaft torque of a predetermined amount to open a signal circuit to condition said closed loop controller for downshift operation and to interrupt said engagement signal actuating the second pulse width modulation circuit.

4. An electronic control system as in claim 2, including a reaction torque computation circuit, connected to receive the output torque signal from the transducer and to logic control circuit, coupled to the reaction torque computation circuit and operative to provide a plurality of logic command signals for application to the closed loop controller and to the downshift controller upon receipt of the reaction torque signal.

5. An electronic control system as claimed in claim 1, including a variable gain control between the closed loop controller and each of the first and second pulse width modulator circuits, adaptive computer means connected to said downshift signal and to each of said gain controls to set said gain controls to a predetermined relationship for the downshift in response to said downshift signal.

6. An electronic control system as in claim 1 wherein said closed loop controller includes a summation stage, a ramp stage connected to said summation stage to provide said downshift ramp slope and switch means connected to said summation stage to adjust the torque level of said ramp.

7. An electronic control system for regulating change of gear ratio in an automatic transmission having first and second controllable friction elements connected for actuation by a change in fluid pressure applied thereto comprising:
- a transducer, positioned to sense the torque at the transmission output driving connection and to provide an electrical signal which varies as a function of the output torque;
- a first control valve, coupled to a supply fluid line for regulating the fluid pressure at the first friction element;
- a second control valve, coupled to the fluid supply line for regulating the fluid pressure at the second friction element;
- first and second actuation means respectively coupled to the first and second control valves, for providing control signals to regulate operation of the valves;
- a closed loop controller, coupled between the transducer and the first actuation means including means to provide an output shaft torque downshift ramp in response to a downshift signal and to receive the output torque signal as a feedback signal and provide an error signal with respect to said ramp for regulating operation of the first and second actuation means as a function of the error signal;
- said error signal being plus or minus and means in the circuit between said closed loop controller and said second actuation means to invert said signal whereby said first and second actuation means react oppositely to said error signal so that said friction elements are controlled in a way to have the output shaft torque follow said downshift ramp.

8. An electronic control system as claimed in claim 7, including a downshift controller responsive to a downshift signal from a logic control circuit to provide an engagement signal to actuate said second actuation means to start engagement of said second friction element to initiate the downshift.

9. An electronic control system as claimed in claim 8, wherein said downshift controller includes a comparator also receiving a downshift signal which is related to the output shift torque and responsive to a drop in output shaft torque of a predetermined amount to open a signal circuit to condition said closed loop controller for downshift operation and to interrupt said engagement signal actuating the second actuation means.

10. An electronic control system for regulating change of gear ratio in a transmission including first and second engageable elements connected for actuation by a change in fluid pressure applied thereto comprising:
- means to sense the torque at the transmission output driving connection and to provide an electrical signal which varies as a function of the output torque;
- a first control valve, coupled to a supply fluid line for regulating the fluid pressure at the first friction element;
- a second control valve, coupled to the fluid supply line for regulating the fluid pressure at the second friction element;
- first and second actuation means respectively coupled to the first and second control valves, for providing control signals to regulate operation of the valves;
- a closed loop controller, coupled between the torque sensing means and the actuation means including means to provide an output shaft torque downshift ramp in response to a downshift signal and to receive the output torque signal as a feedback signal and provide an error signal with respect to said ramp for regulating operation of the first and second actuation means as a function of the error signal;
- said actuating means actuating said friction elements in response to said error signal, said actuating means actuating said friction elements in response to said error signal whereby said friction elements react oppositely and are thereby controlled in a way to have the output shaft torque follow said downshift ramp.

11. An electronic control system as claimed in claim 10 including a downshift controller responsive to a downshift signal from a logic control circuit to provide an engagement signal to actuate said second actuator means to start engagement of said second friction element to initiate the downshift.

12. The method of regulating gear ratio change by control of two engageable devices in a gear set coupled between an automotive engine and an output drive, comprising the steps of:

sensing the output torque provided by the gear set;
providing a feedback signal which varies as a function of the output torque;
establishing a reference torque ramp signal;
continually comparing the feedback signal with the torque ramp signal to develop an error signal throughout the gear ratio change;
providing actuation means responsive to the error signal to control the engageable devices; and
having said actuation means and said engageable devices arranged such that one of said devices is actuated toward engagement and the other toward disengagement in response to said error signal whereby said output shaft torque will follow said torque ramp during said shift.

13. The method of claim 12 including the steps of;
providing an error signal which is positive when said output shaft torque is above said ramp and negative when said output shaft torque is below said ramp; and
having said actuation means actuate one of said devices toward engagement and the other of said devices toward disengagement when said error signal is positive, and actuate said other device toward engagement and said one device toward disengagement when said error signal is negative.

14. The method of claim 12 including the steps of;
providing an error signal which is of a first value when said output shaft torque is above said ramp and a second value when said output shaft torque is below said ramp; and
having said actuation means actuate one of said devices toward engagement and the other of said devices toward disengagement when said error signal is of said first value, and actuate said other device toward engagement and said one device toward disengagement when said error signal is of said second value.

* * * * *